United States Patent Office 3,127,204
Patented Mar. 31, 1964

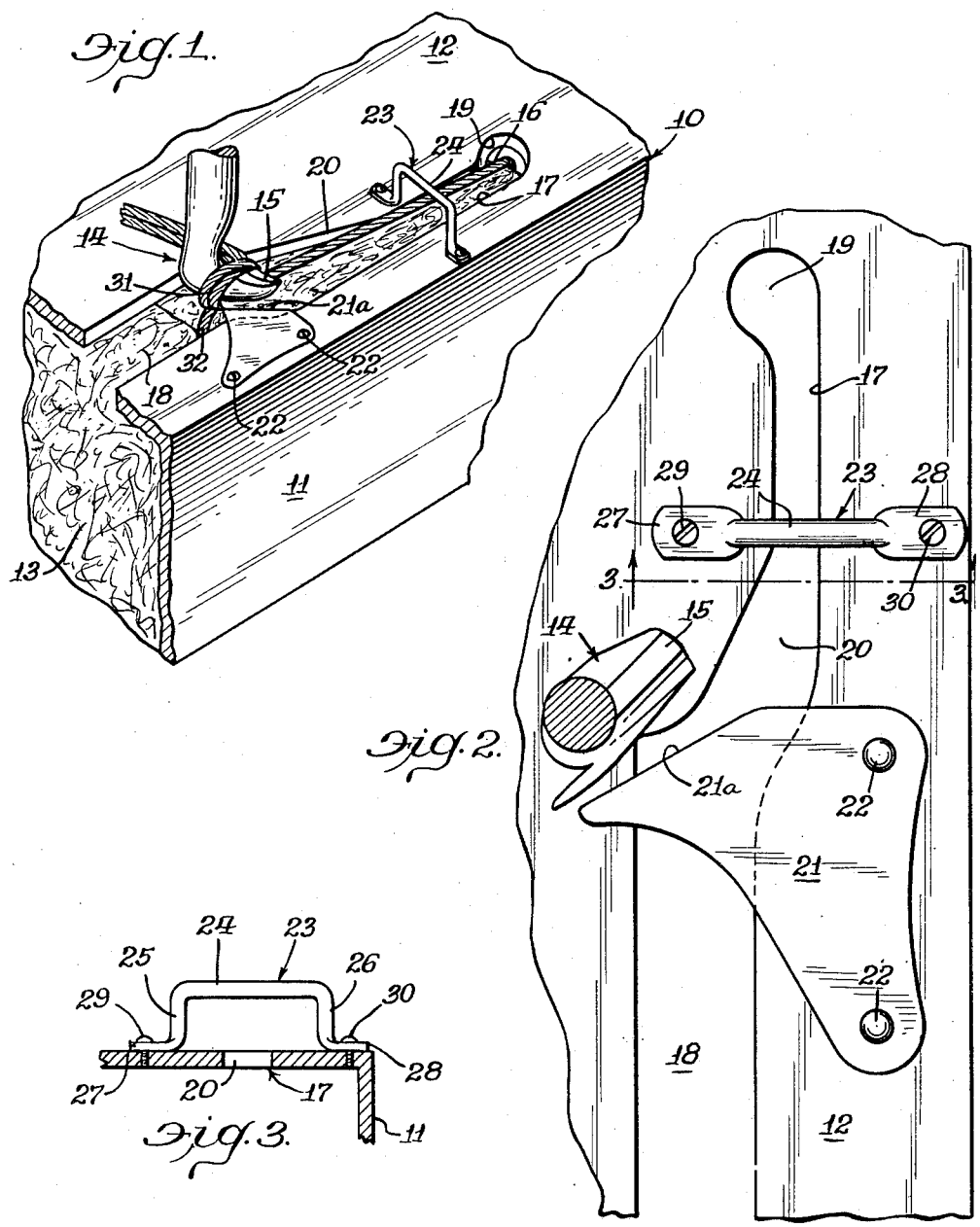

3,127,204
KNOT STRIPPER FOR BALERS
Herbert D. Sullivan, Memphis, Tenn., and Guy O. Tufts, Phoenix, Ariz., assignors to International Harvester Company, Chicago, Ill., a corporation of New Jersey
Filed Feb. 26, 1962, Ser. No. 175,543
9 Claims. (Cl. 289—15)

This invention relates to a new and improved knot stripper for balers.

Present day balers are called automatic balers for the reason that they operate to compress and tie hay in bale formation without an attendant other than the driver of the pulling vehicle. It is thus imperative that all of the mechanisms of the baler and knotter operate efficiently without individual attention. One of the important considerations in automatic balers is to prevent the twine from breaking. Movement of formed and tied bales through the bale forming chamber is accomplished by the admission of new quantities of hay to the chamber and the subsequent compression of this hay. It is this means of bale propulsion that causes the twine knot to be stripped from the knotter. It is important that the knotter bill hook be in proper position to permit stripping of a knot therefrom upon longitudinal movement of a newly tied bale. Of course the side of the bale forming chamber adjacent the knotter is equipped with slots to permit passage of twine-carrying needles and to permit the knots to move inwardly of the chamber for concurrent movement with the bale as it progresses through the bale forming chamber.

A principal object of this invention is to provide a bale forming chamber with an elongated slot in the side thereof adjacent the knotter mechanism and shaped to facilitate the stripping of a formed knot from the knotter bill hook.

An important object of this invention is the provision of an elongated slot in a bale forming chamber to facilitate knot stripping, the slot including a relatively broad needle passage portion at one end thereof and an offset portion considerably narrower at its other end for the passage of the formed twine knot.

Another important object of this invention is to supply a twine-guiding means in association with a twine stripping slot in a bale forming chamber.

Still another important object of this invention is to equip an elongated twine-stripping slot with a bridge spanning the slot intermediate its ends and arranged and constructed to guide twine from the bill hook to an offset portion of the slot to provide for stripping of the knot from the bill hook to the slot without snagging any of the twine strands.

Another and still further important object of this invention is to provide an inverted U-shaped bridge for a twine stripping slot on a hay baler.

Still another important object of this invention is the provision of an arrangement on a bale forming chamber wherein a twine guiding plate is positioned closely adjacent a knotter bill hook and longitudinally and laterally spaced apart therefrom is a bridge spanning the twine stripping slot in the bale forming chamber and disposed with respect to the bill hook and the twine guiding plate such that twine will be guided into a narrow offset end portion of the slot into the interior of the bale forming chamber.

Other and further important objects and advantages will become apparent from the disclosures in the following specification and accompanying drawings.

In the drawings:

FIGURE 1 is a perspective view showing a broken-away portion of a bale forming chamber and including an illustration of the knot stripping mechanism of this invention.

FIGURE 2 is a top plan view of a portion of the bale forming chamber of FIGURE 1.

FIGURE 3 is a sectional view taken on the line 3—3 of FIGURE 2.

As shown in the drawings:

The reference numeral 10 indicates generally a bale forming chamber having a side 11 and a top 12. Relatively loose hay is fed into the bale forming chamber and compressed into the relatively dense formation shown at 13 in FIGURE 1. In general the hay baler of this invention is comparable to that shown in the Crumb et al. Patent 2,450,082.

Twine-carrying needles (not shown) receive twine from a source of supply and carry the twine upwardly through the bale forming chamber to a position adjacent a twine knotting mechanism. As the hay is pushed into the bale forming chamber it causes an extension of the twine strand which has been originally laid through the chamber and thus the twine is extended around the bale in an endwise direction. Upon completion of the formed bale to some predetermined desired length the twine-carrying needle comes up around the inner end of the formed bale to thereby completely encircle the bale with the twine strand. A knot is then tied in the ends of the strands and the bale continues its movement out the end of the bale forming chamber 10. Thus it is important that the bale have a means of propulsion and also that the knot be capable of easy stripping from the knotter to follow the moving bales. The source of twine supply, the twine-carrying needles and the major portion of the twine knotter mechanism have not been shown inasmuch as they form no part of the present invention. The environment of these elements is shown in the Crumb et al. patent mentioned above.

The twine knotter includes a bill hook 14 of which only the lower portion has been shown in this drawing. The bill hook 14 includes a hinged jaw 15 to effect a gripping of the twine strand and to cause a central portion of the twine strand to be pulled through an outer loop of the strand and thereby make a knot in the strand. A bale encircling tie strand is shown at 16 passing around the compressed hay 13 and being engaged at one end by the bill hook 14.

The present invention contemplates primarily an elongated slot 17 in the top 12 of the bale forming chamber 10. The forward portion 18 of the elongated slot 17 is relatively wide and receives the needles which carry the twine upwardly from the bottom of the bale forming chamber through to the top for engagement by the knotter. The other end 19 of the elongated slot 17 is relatively narrow and is laterally offset from the wide forward portion 18. The narrow slot end 19 is shaped as a key hole. A central portion 20 of the slot 17 joins the needle-passing wide end 18 and the knot-stripping end 19.

A twine guiding plate 21 is positioned adjacent the bill hook 14 and aids in preventing twine from building up on the bill hook and/or improper directional stripping of the formed twine knot. The twine guiding plate is attached by means of rivets 22 to the top 12 of the chamber 10 closely adjacent the wide end 18 of the elongated slot 17. An upper laterally extending guiding end 21a of the plate 21 is located substantially parallel to the bill hook 14 in its stripping position as shown in FIGURE 2. This substantially parallel relationship of the bill hook and the guiding plate forms a narrow passageway through which the twine and the formed knot are guided toward the offset portions 19 and 20 of the elongated slot 17.

An auxiliary twine guide 23 in the form of a bridge is shown in all of FIGURES 1, 2 and 3. This guiding member 23 bridges or spans the central portion 20 of the elongated slot 17. The bridge includes a top 24, substantially parallel downwardly projecting sides 25 and 26, and outwardly bent flanges 27 and 28 on the lower ends of the sides. It is these bent ends 27 and 28 that form the means for attachment of the bridge to the top 12 of the chamber 10. Bolts or other fastening members 29 and 30 pass through the outwardly bent flanges 27 and 28 and engage the top 12 of the bale forming chamber. The bridge is an inverted U-shaped member that facilitates the guiding of the twine and its knot from the bill hook 14 to and through the narrow key-shaped opening 19 in the elongated slot 17. The bridge avoids binding of the twine around any edges of the slot and the bill hook. The bridge thus facilitates the transfer of the knot from the bill hook 14 to the laterally offset discharging end 19 of the elongated slot 17 without binding or tangling.

The commencement of the knot is shown in the wrappings 31 of twine strand around the bill hook 14. It is this knot which eventually must strip off from the bill hook at the angle shown in FIGURE 2. Stripping is accomplished by the longitudinal propulsion of the completed and newly tied bale through the bale forming chamber 10 by reason of the insertion of new hay into the chamber for the purpose of forming a succeeding bale. The longitudinal movement of the newly tied bale causes a natural pulling of the knot from the angularly disposed bill hook. With the aid of the guiding plate 21 and the inverted U-shaped bridge spanning the central portion of the slot 17 the knot is moved laterally and longitudinally to the discharging end 19 of the elongated slot 17 without any restriction or binding thereof.

In the operation of the device of this invention a hay baler traverses a field in which hay has been preliminarily placed in windrows. The baler picks up the hay from the windrow and puts it into the bale forming chamber 13. A compressing means (not shown) is adapted to condense the hay within the bale forming chamber 10 and when the bale is sufficiently dense and has attained some predetermined length then the tying mechanism comes into operation. The twine 16 encircles the newly formed bale 13 by a strand end 32 being carried up to the bill hook 14. The rotation of the bill hook 14 causes the strand ends to make a loop as shown at 31 and with the aid of the movable jaw 15 the loop 31 is converted into a knot. The knot thus ties the bale encircling strand ends together to form an endless strand. The formed endless strand must move out with the newly formed bale of hay to cause the hay to retain its bale formation. The wide forward portion 18 of the elongated slot 17 receives the twine-carrying needles whereas the narrow offset end 19 of the slot is for the discharge of the formed knot. There is thus the necessity of moving the knot from the bill hook 14 laterally from the wide forward portion 18 of the slot 17 to the narrow portions 19 and 20 of the slot 17. This lateral and longitudinal movement of the knot is accomplished in part by the twine guiding plate 21 through its angularly disposed edge 21a lying substantially parallel to the discharge position of the bill hook 14. The bridge spanning guide member 23 completes the knot guiding movement as shown in FIGURE 1. The geographical arrangement of guiding elements is particularly shown in FIGURE 2. The lateral offset in the slot depicts the necessity for guiding the twine from the key hole slotted end 19 to the bill hook. The breast plate 21 and the slot-spanning bridge 23 combine as guide elements to eliminate twine or knot binding during stripping of the knot from the bill hook 14. The ready stripping of the knot permits the completed bale to move out the end of the bale forming chamber.

We are aware that numerous details of construction may be varied throughout a wide range without departing from the principles disclosed herein and we therefore do not propose limiting the patent granted hereon otherwise than as necessitated by the appended claims.

What is claimed is:

1. A knot stripper for balers comprising a bale forming chamber having an elongated slot therein extending in a generally longitudinal direction, said slot having a first relatively wide needle-passing end portion, a second relatively narrow knot stripping end portion laterally offset from the first portion, an intermediate portion of said slot joining said wide and narrow ends, a knot-forming bill hook disposed adjacent the wide end portion of said slot, and bridge guide means for guiding a knot being stripped from said bill hook spanning said slot at a point removed from said bill hook in the direction of said knot-stripping end portion of said slot, whereby a knot formed on said bill hook is guided laterally through said bridge guide means for discharge through the narrow end portion of said slot.

2. A device as set forth in claim 1 in which said bridge guide means includes an inverted U-shaped member.

3. A device as set forth in claim 1 in which said bridge guide means is disposed at substantially a right angle with respect to said longitudinally disposed slot.

4. A knot guide for balers comprising:
   (a) a bale forming chamber having an elongated slot extending generally longitudinally thereof, said slot having a needle-passing portion and a knot-stripping portion,
   (b) a knotter adjacent one end of said elongated slot, and
   (c) bridge means spanning said slot at a point removed from said knotter in the direction of said knot-stripping portion of said slot for guiding a knot stripping from said knotter.

5. A knot guide for balers comprising:
   (a) a bale forming chamber having an elongated slot extending generally longitudinally thereof,
   (b) a knotter adjacent one end of said elongated slot,
   (c) said slot having a relatively wide needle-passing end adjacent said knotter,
   (d) said slot at its other end having a relatively narrow knot-stripping portion laterally offset from said wide end, and
   (e) bridge means spaning said slot for guiding a knot stripping from said knotter to and through the laterally offset narrow end of the slot.

6. A knot guide for balers comprising:
   (a) a bale forming chamber having an elongated slot extending generally longitudinally thereof, said slot having a needle-passing portion and a knot-stripping portion,
   (b) a knotter adjacent said needle-passing portion of said elongated slot,
   (c) said knotter having a bill hook inclined toward said knot-stripping portion of said slot, and
   (d) bridge means spanning said slot for guiding a knot stripping from said knotter to and through the knot-stripping portion of the slot.

7. A knot guide for balers comprising:
   (a) a bale forming chamber having an elongated slot extending generally longitudinally thereof, (b) a knotter adjacent one end of said elongated slot,
(c) said slot having a relatively wide needle-passing portion at the end adjacent said knotter,
(d) said slot at its other end having a relatively narrow knot-stripping portion laterally offset from said wide end,
(e) said knotter having a bill hook inclined toward said narrow offset portion of said slot,
(f) a fixed guide plate having an edge substantially parallel to and slightly spaced from said inclined bill hook, and
(g) bridge means spanning said slot for guiding a knot stripping from said knotter to and through the narrow knot-stripping portion of the slot.

8. A device as set forth in claim 7 in which said bridge means includes an inverted U-shaped member.

9. A device as set forth in claim 8 in which said bridge means is disposed at substantially right angles to said slot.

References Cited in the file of this patent

UNITED STATES PATENTS

| | | |
|---|---|---|
| 264,909 | Symonds | Sept. 26, 1882 |
| 446,784 | Lowry | Feb. 17, 1891 |
| 492,591 | Stark | Feb. 28, 1893 |
| 803,311 | Stoffel | Oct. 31, 1905 |